United States Patent
Mohajeri et al.

(10) Patent No.: US 11,415,004 B2
(45) Date of Patent: Aug. 16, 2022

(54) CORROSION AND OXIDATION RESISTANT COATINGS FOR GAS TURBINE ENGINES, AND METHODS FOR PRODUCING THE SAME

(71) Applicant: HONEYWELL INTERNATIONAL INC., Charlotte, NC (US)

(72) Inventors: Mahdi Mohajeri, Morristown, NJ (US); Bahram Jadidian, Morristown, NJ (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 0 days.

(21) Appl. No.: 17/116,426

(22) Filed: Dec. 9, 2020

(65) Prior Publication Data
US 2022/0178263 A1    Jun. 9, 2022

(51) Int. Cl.
*F01D 5/28* (2006.01)
*C23C 30/00* (2006.01)

(52) U.S. Cl.
CPC .............. *F01D 5/288* (2013.01); *C23C 30/00* (2013.01); *F01D 5/282* (2013.01)

(58) Field of Classification Search
CPC .......... F01D 5/288; F01D 5/282; C23C 30/00
See application file for complete search history.

(56) References Cited

U.S. PATENT DOCUMENTS

| | | | |
|---|---|---|---|
| 6,086,793 A * | 7/2000 | Tani | H01B 1/026 252/512 |
| 6,440,575 B1 | 8/2002 | Heimberg et al. | |
| 6,444,332 B1 * | 9/2002 | Bettridge | C23C 10/60 416/241 B |
| 2009/0098394 A1 | 4/2009 | Skoog et al. | |
| 2015/0251950 A1 * | 9/2015 | Watanabe | C03C 17/25 428/325 |
| 2020/0098515 A1 | 3/2020 | Piascik et al. | |
| 2020/0230645 A1 * | 7/2020 | Overholser | B05D 3/0254 |

FOREIGN PATENT DOCUMENTS

| | | |
|---|---|---|
| CN | 102627405 A | 8/2012 |
| CN | 103924205 A | 7/2014 |
| EP | 1586676 B1 | 3/2008 |
| WO | 2019108220 A1 | 6/2019 |
| WO | WO-2019108220 A1 * | 6/2019 ............. F01D 5/147 |

* cited by examiner

*Primary Examiner* — Jacob M Amick
*Assistant Examiner* — Charles J Brauch
(74) *Attorney, Agent, or Firm* — Lorenz & Kopf, LLP

(57) ABSTRACT

Disclosed is a superalloy gas turbine engine component including a glass coating. The glass coating is configured for resistance to hot corrosion caused by molten salts of sodium, magnesium, vanadium, and/or sulfur dioxide. The glass coating includes a mixture of two or more metal oxides, which are preferably selected from: barium oxide, silicon oxide, strontium oxide, aluminum oxide, magnesium oxide, calcium oxide, cobalt oxide, boron oxide, iron oxide, zirconium oxide, nickel oxide, and titanium oxide. The glass coating is in fully crystalline form and/or a mixture of crystalline and glass phases, and it has a coefficient of thermal expansion of from about 10 to about 18 μm/m-° C. The glass coating has a thickness over the superalloy gas turbine engine component of about 0.5 mils to about 10 mils.

16 Claims, 2 Drawing Sheets

CORROSION AND OXIDATION RESISTANT COATINGS FOR GAS TURBINE ENGINES, AND METHODS FOR PRODUCING THE SAME

TECHNICAL FIELD

The present disclosure generally relates to the technical field of gas turbine engines. More particularly, the present disclosure relates to high-temperature corrosion and oxidation resistant coatings, which are formed over superalloy and nickel-based superalloys gas turbine engine components, and methods for producing such coatings.

BACKGROUND

Gas turbine engines are employed in a variety of applications, such as thrust production for vehicles of all types (aerospace, marine, and heavy land vehicles, for example), electrical energy production, and many others. Turbine engines may include a compressor section, wherein inlet air is compressed, followed by a combustor section wherein fuel is combusted with the compressed air to generate exhaust gas. The exhaust gas is then directed to a turbine section, wherein energy is extracted from the exhaust gas, and used for propulsion or to perform work.

To improve the fuel efficiency and performance of gas turbine engines, considerable effort has been made in the prior art to achieve a steady, continuous increase in the operating temperatures of the turbine sections over the past many years. Advances in materials, such as substrate materials and coating materials, along with the development of new cooling schemes, which typically employ compressor bleed air directed over sections exposed to hot gasses, has led to increased operating temperatures of next-generation gas turbine engines.

It is known that gas turbine engines may be operating in environments or atmospheres that contain contaminants, and, that during operation, such contaminants may be ingested into the engines. With the combination of ever-increasing operating temperatures and an aircraft environment/atmosphere that contains contaminants, including for example sodium, sulfur, magnesium, and/or vanadium, it has been hypothesized that some components of the turbine engine may, from time to time, experience the phenomenon of "hot corrosion". Hot corrosion may result from the deposition of low-melting temperature salts, such as sodium sulfate and magnesium sulfate, derived from the external environment/atmosphere. These salts react with and disrupt the protective oxide layer that is typically provided on the surface of the superalloys and metallic coatings that are used in gas turbine engine manufacture.

Moreover, hot corrosion, unlike oxidation, may consume the protective material at an unpredictable rate, depending on environmental conditions. Consequently, the load-carrying ability of the component subjected to hot corrosion (such as a turbine blade) may be reduced, leading eventually to its consideration for repair or replacement. Compounding the problem is the difficulty experienced in attempting to detect any signs of hot corrosion at an early stage, when less intensive and expensive interventions could be attempted. As such, in some instances, the inability to either totally prevent hot corrosion, or at least detect it at an early stage, has resulted in loss of service life of various engine components and/or the need for additional repairs.

In particular, nickel-based superalloys such as Alloy 10, which are commonly used in turbine section components, may experience relatively rapid hot corrosion in the presence of molten sodium sulfate at temperatures as low as about 700° C., which is well-within the operating temperature range of many modern gas turbine engines. In this temperature range, pits can form in the alloy, creating localized high stresses under service loading during normal operations. Cracks may then initiate and propagate form these pits, leading to the possibility of the need for intensive repair efforts, or even replacement of the affected components. Moreover, not only does hot corrosion occur on nickel-based superalloy itself, but also to the chromium and aluminum rich coatings that are often applied on the alloy as thermal barrier or environmental barrier coatings, further compounding the problem.

Accordingly, the prior art remains deficient. It would therefore be desirable to provide improved coatings for gas turbine engines that are able to resist hot corrosion in various operating environments/atmospheres. Moreover, it would be desirable to provide methods for the preparation and application of such coatings to gas turbine engines. Furthermore, other desirable features and characteristics of the coatings and related manufacturing methods will become apparent from the subsequent detailed description and the appended claims, taken in conjunction with the accompanying drawings and the preceding background.

BRIEF SUMMARY

In one exemplary embodiment, the present disclosure provides a superalloy gas turbine engine component including a glass coating. The glass coating is configured for resistance to hot corrosion caused by molten salts such as sodium, magnesium, vanadium, and/or sulfur dioxide. The glass coating includes a mixture of two or more metal oxides, which are preferably selected from: barium oxide, silicon oxide, strontium oxide, aluminum oxide, magnesium oxide, calcium oxide, cobalt oxide, boron oxide, iron oxide, zirconium oxide, nickel oxide, and titanium oxide. The glass coating is in fully crystalline form and/or a mixture of crystalline and glass phases, and it has a coefficient of thermal expansion of from about 10 to about 18 μm/m-° C. The glass coating has a thickness over the superalloy gas turbine engine component of about 0.5 mils to about 10 mils, preferably about 0.5 to about 3 mils, and most preferably about 1 mil. Without being bound by theory, it is believed that the glass coating reacts with the molten salts to increase the melting point of the salt, thereby preventing deposition on the gas turbine engine component.

In another embodiment, the present disclosure provides a method for coating a superalloy gas turbine engine component with a glass coating. The method includes the step of providing a glass powder. The glass powder includes two or more metal oxides, which are preferably selected from the group consisting of: barium oxide, silicon oxide, strontium oxide, aluminum oxide, magnesium oxide, calcium oxide, cobalt oxide, boron oxide, iron oxide, zirconium oxide, nickel oxide, and titanium oxide. The method further includes the steps of forming a slurry or paste from the glass powder by adding to the glass powder an amount of one or more volatile organic compounds and one or more organic binders and applying the slurry or paste to the superalloy gas turbine engine component, preferably utilizing brush painting, doctor-blading, screen printing, or spray painting. Applying the slurry or paste is performed so as to achieve a final thickness of the glass coating over the superalloy gas turbine engine component of about 0.5 mils to about 10 mils, preferably about 0.5 to about 3 mils, and most preferably about 1 mil. The method further includes the step of drying the coating applied to the superalloy gas turbine engine component to remove the one or more volatile organic compounds and the one or more organic binders. Drying is preferably performed in a first step at a temperature of about 90° C. to about 130° C. for a time period of about 10 minutes to about 30 minutes, and in a second step at a temperature of about 400° C. to about 600° C. for a time period of about 10 minutes to about 30 minutes. Still further, the method includes the step of heating the coating applied to the superalloy gas turbine for densification and/or crystallization of the coating to thereby form the glass coating transformed to crystalline phase and/or a mixture of crystalline/amorphous phases. Heating is preferably performed at a temperature of about 760° C. to about 850° C. for a time period of about 10 minutes to about 15 minutes in a vacuum, an inert atmosphere, and/or an atmosphere having a different partial pressure of oxygen gas compared to air. The glass coating is in fully crystalline form and/or a mixture of crystalline and glass phases, and it has a coefficient of thermal expansion of from about 10 to about 18 μm/m-° C.

This Brief Summary is provided to describe select concepts in a simplified form that are further described in the Detailed Description. Moreover, this Brief Summary is not intended to identify any key or essential features of the claimed subject matter, nor is it intended to be used as an aid in determining the scope of the claimed subject matter.

BRIEF DESCRIPTION OF THE DRAWING

The present disclosure will hereinafter be described in conjunction with the following Drawing Figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention, which is defined by the claims. Furthermore, there is no intention to be bound by any expressed or implied theory presented in the preceding Technical Field, Background, Brief Summary, or the following Detailed Description.

The present disclosure generally describes novel coatings that protect gas turbine engine components from hot corrosion, and methods for preparing the same. In embodiments, the coating is a glass that includes different ratios of metal oxides such as barium oxide, silicon oxide, strontium oxide, aluminum oxide, magnesium oxide, calcium oxide, cobalt oxide, and titanium oxide. The thermal expansion coefficient (CTE) of the glass coating is in the range of about 10-18 μm/m-° C. and can be adjusted with adding particulates. In the manufacture of the coating, a slurry or paste is first made using fine glass powder. The paste is then applied onto desired metal surface by brush painting, doctor-blading, or screen printing. The paste can also be diluted to form a slurry of low viscosity for spray painting it onto the desired metal surface of the component. Low temperature volatile components are next removed during drying step in an oven. Organic compounds of the paste or/and slurry are then burned-out during binder burnout process. The coating is then heated for final densification and crystallization. This last heating step results in a strong bond between the glass and component substrate. The thickness of coating can be varied between 0.5 to and 10 mils. Greater detail regarding the coating and its process for manufacture are provided below, in connection with FIGS. 1-3.

Figure 1:
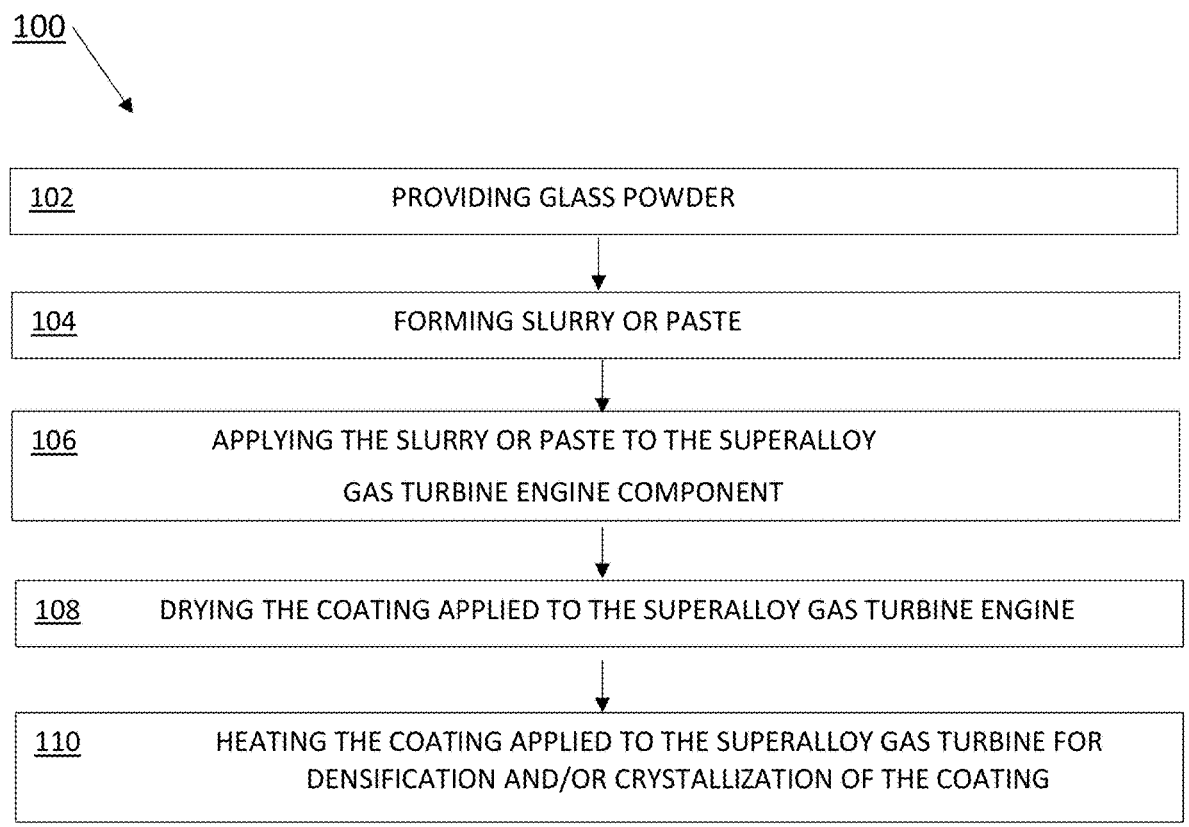
FIG. 1 depicts a process flow diagram illustrating a method for manufacturing a coating in accordance with the present disclosure.

Turning first to FIG. 1, in an embodiment, a method 100 for manufacturing a hot corrosion resistance coating is illustrated. In a first step 102, method 100 includes providing or otherwise obtained (for example, from commercial sources) a glass powder. The glass powder includes a mixture of two or more metal oxides. Suitable types of these metal oxides include the following, as non-limiting examples: barium oxide, silicon oxide, strontium oxide, aluminum oxide, magnesium oxide, calcium oxide, cobalt oxide, boron oxide, iron oxide, zirconium oxide, nickel oxide, and titanium oxide. The glass powder may be provided by grinding a glass material into powder form, wherein mean particle size is several microns or less. The mixture will typically include at least about 10% or more of a first powder selected from the aforementioned group, and about 90% or less of a second powder so-selected. Third, fourth, fifth, etc. powders may be provided in a mixture. The selection of the particular metal oxide(s) will depend on the desired material properties of the glass coating, for example with respect to the anticipated operating environment/atmosphere, the intended component to be coated, or with respect to the desired coefficient of thermal expansion, as described below.

Method 100 further includes step 104 of forming a slurry or paste from the glass powder by adding to the glass powder an amount of one or more volatile organic compounds and one or more organic binders, along with optional surfactants. The volatile organic compounds may be of the class of low boiling point solvents, such as alcohols (ethanol, isopropanol, t-butanol, etc.), ketones, aldehydes, and the like. The organic binders may be of the class of binders typically used with ceramics, for example acrylic polymers, and may be used with a loading of about 0.5% to about 5% by weight, based on the weight of the glass powder. One suitable commercial example is the Duramax™ family of binders available from Dow Chemical of Midland, Mich., USA. The surfactants that may be used to form the slurry or paste include, for example, medium-chain carboxylates of ammonium or sodium, such as C8-C21 ammonium or sodium carboxylate. The amount of surfactant employed will depend on the desired viscosity of the slurry or paste, which in turn depends on its intended application method, as will be described in greater detail below.

Method 100 further includes step 106 of applying the slurry or paste to the superalloy gas turbine engine component. As just noted, various methods may be employed to accomplish this step. For example, one application method is utilizing brush painting, doctor-blading, screen printing, or spray painting. In brush painting, as the name implies, the slurry or paste is applied in a stroke-like fashion using an industrial coating brush to achieve the desired coating thickness an application location. A doctor blade is an adjustable-height film applicator that includes a (straight or contoured) blade set in a housing that can maintain a selected clearance height from the substrate during application. Screen printing employs a screen overlaid on the substrate, wherein the slurry or paste is forced through the screen with an implement, onto the substrate. Moreover, spray painting utilizes a spray gun to direct an even layer of the slurry or paste onto selected portions of the substrate, utilizing pressure. Applying the slurry or paste is performed so as to achieve a final thickness of the glass coating over the superalloy gas turbine engine component of about 0.5 mils to about 10 mils, preferably about 0.5 to about 3 mils, and most preferably about 1 mil.

The method 100 further includes a step 108 of drying the coating applied to the superalloy gas turbine engine component to remove the one or more volatile organic compounds and the one or more organic binders. Drying is preferably performed in a first step at a temperature of about 90° C. to about 130° C. for a time period of about 10 minutes to about 30 minutes, and in a second step at a temperature of about 400° C. to about 600° C. for a time period of about 10 minutes to about 30 minutes. The first step of drying will remove a majority of the low boiling-point temperature volatile organic compounds, whereas the second step of drying will remove a majority of the organic binder compounds. In a preferred embodiment, the first step is performed at a temperature of about 95° C. to about 125° C. for a time period of about 15 minutes to about 25 minutes, and the second step is performed at a temperature of about 450° C. to about 550° C. for a time period of about 15 minutes to about 25 minutes. The first and second drying steps may be performed in a suitable batch or continuous-process industrial oven.

Still further, the method 100 includes the step 110 of heating the coating applied to the superalloy gas turbine for densification and/or crystallization of the coating to thereby form the glass coating transformed to crystalline phase and/or a mixture of crystalline/amorphous phases. Heating is preferably performed at a temperature of about 760° C. to about 850° C. for a time period of about 10 minutes to about 15 minutes in a vacuum, an inert atmosphere, and/or an atmosphere having a different partial pressure of oxygen gas compared to air. More preferably, heating is performed at a temperature of about 770° C. to about 800° C. for a time period of about 10 minutes to about 15 minutes in such an atmosphere. The glass coating is in fully crystalline form and/or a mixture of crystalline and glass phases subsequent to step 110, and it has a coefficient of thermal expansion (CTE) of from about 10 to about 18 µm/m-° C. CTE may be suitably varied by changing the relative composition of the glass materials, and/or their ratios, which make-up the two or more metal oxides. A more preferred CTE range is about 12 to about 16 µm/m-° C.

Subsequent to performing the method 100, a coating has been formed on the gas turbine engine component that is resistant to hot corrosion. More specifically, a glass coating has been formed, wherein the glass coating is configured for resistance to hot corrosion caused by molten salts of sodium, magnesium, vanadium, and/or sulfur dioxide. The glass coating includes the above-described mixture of two or more metal oxides, which have been selected from: barium oxide, silicon oxide, strontium oxide, aluminum oxide, magnesium oxide, calcium oxide, cobalt oxide, and titanium oxide. The glass coating is in fully crystalline form and/or a mixture of crystalline and glass phases, as a result of the final heat step 110, and it has a coefficient of thermal expansion of from about 10 to about 18 µm/m-° C. The glass coating has a thickness over the superalloy gas turbine engine component of about 0.5 mils to about 10 mils, preferably about 0.5 to about 3 mils, and most preferably about 1 mil, as a result of the application step 106. Without being bound by theory, during normal operation of the gas turbine engine, it is believed that the glass coating reacts with the molten salts to increase the melting point of the salt, thereby preventing (at least substantially) deposition on the gas turbine engine component.

Figure 2:
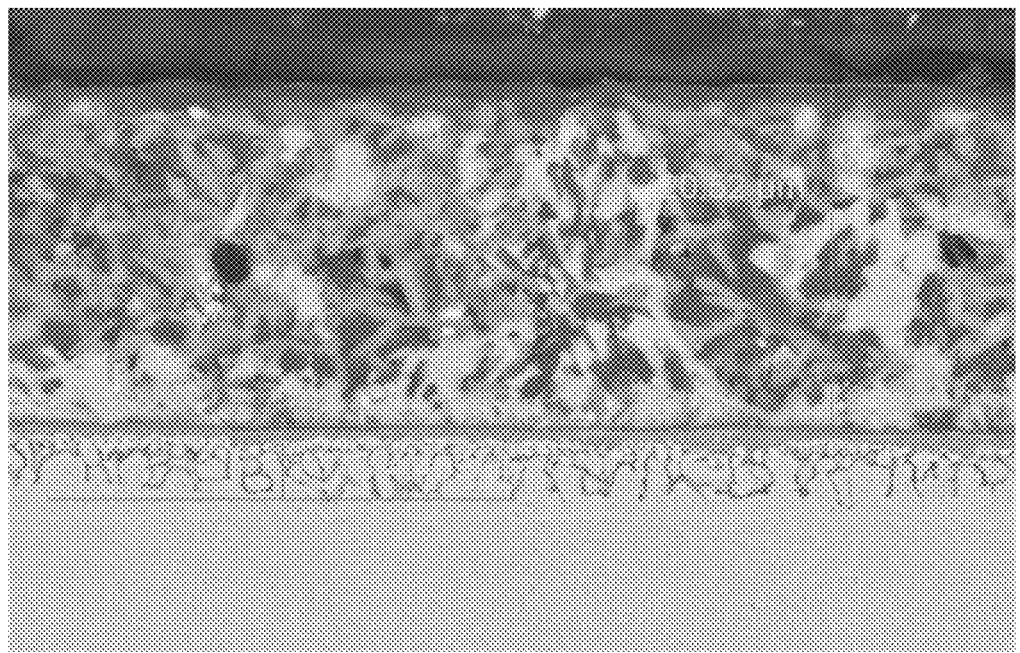
FIG. 2 is a cross-sectional image of a coating prepared in accordance with the method illustrated in FIG. 1.
Figure 3:
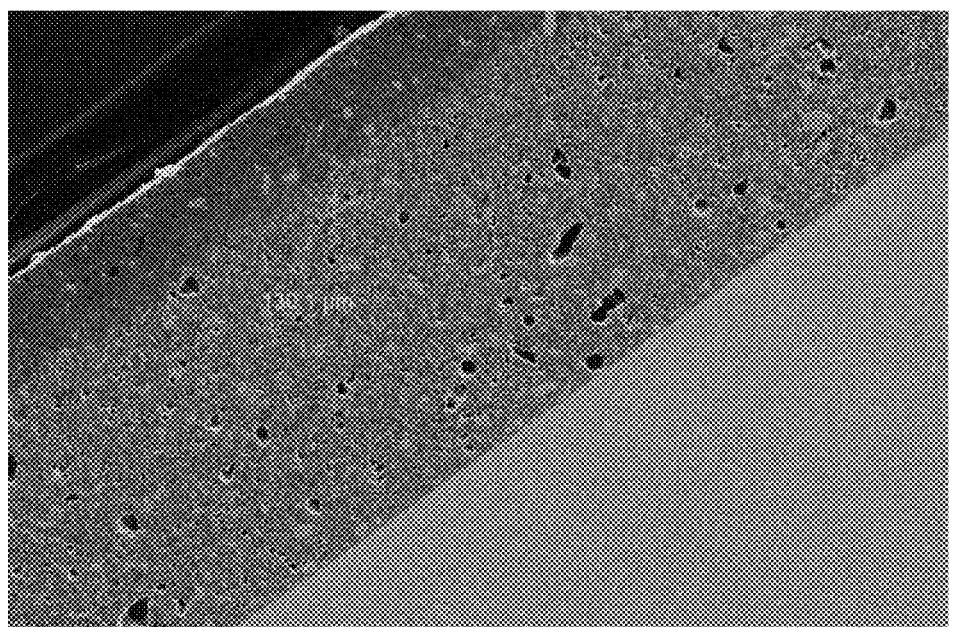
FIG. 3 is a further cross-sectional image of a coating prepared in accordance with the method illustrated in FIG. 1.

Turning now to FIGS. 2 and 3, various coatings in accordance with the present disclosure have been prepared over gas turbine engine substrates, and evaluated. For example, as shown in FIG. 2, a glass coating in accordance with the present disclosure having a thickness of about 20.5 microns has been formed over an oxide layer (about 4.4 microns) of the turbine engine component substrate. Excellent adhesion between the two layers is demonstrated. In a further embodiment, as shown in FIG. 3, a further barrier layer has been formed over the glass coating layer, in accordance with the present disclosure. As such, it should be appreciated that any further barrier layers may be employed over the hot corrosion resistance layers of the present disclosure, such as known or further thermal barrier coatings or environmental barrier coatings. As can be seen, excellent adhesion is also demonstrated with the further barrier layer (above the glass coating).

Accordingly, the present disclosure has provided improved coatings for gas turbine engines that are able to resist hot corrosion in various operating environments/atmospheres, particularly as shown in FIGS. 2 and 3. The present disclosure has further provided methods for the preparation and application of such coatings to gas turbine engines, particularly method 100 of FIG. 1.

In this Detailed Description, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined as such. The sequence of the text with regard to methods or processes does not imply that process steps must be performed in a temporal or logical order according to such sequence unless it is specifically defined as such. The process steps may be interchanged in any order without departing from the scope of the present disclosure as long as such an interchange does not contradict the claim language and is not logically nonsensical.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A superalloy gas turbine engine component comprising a glass coating, the glass coating being configured for resistance to hot corrosion caused by molten salts of sodium, magnesium, vanadium, and/or sulfur dioxide gas, the glass coating comprising:

a mixture of two or more metal oxides, which are selected from the group consisting of: barium oxide, silicon oxide, strontium oxide, aluminum oxide, magnesium oxide, calcium oxide, cobalt oxide, boron oxide, iron oxide, zirconium oxide, nickel oxide, and titanium oxide, wherein the glass coating is in fully crystalline form and/or a mixture of crystalline and glass phases and has a coefficient of thermal expansion of from about 10 to about 18 µm/m-° C., and wherein the glass coating has a thickness over the superalloy gas turbine engine component of about 0.5 mils to about 10 mils, wherein the glass coating is configured to react with the molten salts to increase a melting point of the molten salts thereby reducing deposition thereof on the gas turbine engine component.

2. The superalloy gas turbine engine component of claim 1, wherein the glass coating comprises three or more metal oxides.

3. The superalloy gas turbine engine component of claim 1, wherein the glass coating is in a mixture of crystalline and glass phases.

4. The superalloy gas turbine engine component of claim 1, wherein the glass coating has a thickness over the superalloy gas turbine engine component of about 0.5 mils to about 3 mils.

5. The superalloy gas turbine engine component of claim 1, wherein the glass coating has a thickness over the superalloy gas turbine engine component of about 1 mil.

6. The superalloy gas turbine engine component of claim 1, wherein the glass coating is configured to react with the molten salts, thereby preventing deposition thereof on the gas turbine engine component.

7. The superalloy gas turbine engine component of claim 1, wherein superalloy gas turbine engine component is a superalloy or a nickel-based alloy.

8. The superalloy gas turbine engine component of claim 1, wherein the glass coating has a coefficient of thermal expansion of from about 12 to about 16 µm/m-° C.

9. The superalloy gas turbine engine component of claim 1, wherein the superalloy gas turbine engine component comprises a turbine blade.

10. The superalloy gas turbine engine component of claim 1, further comprising a thermal barrier coating or an environmental barrier coating disposed over the glass coating.

11. A method for coating a superalloy gas turbine engine component with a glass coating, the method comprising the steps of:

providing a glass powder, wherein the glass powder comprises two or more metal oxides, which are selected from the group consisting of: barium oxide, silicon oxide, strontium oxide, aluminum oxide, magnesium oxide, calcium oxide, cobalt oxide, boron oxide, iron oxide, zirconium oxide, nickel oxide, and titanium oxide;

forming a slurry or paste from the glass powder by adding to the glass powder an amount of one or more volatile organic compounds and one or more organic binders, and optionally one or more surfactants;

applying the slurry or paste to the superalloy gas turbine engine component, preferably utilizing brush painting, doctor-blading, screen printing, or spray painting, wherein applying the slurry or paste is performed so as to achieve a final thickness of the glass coating over the superalloy gas turbine engine component of about 0.5 mils to about 10 mils;

drying the coating applied to the superalloy gas turbine engine component to remove the one or more volatile organic compounds and the one or more organic binders, wherein drying is performed in a first step at a temperature of about 90° C. to about 130° C. for a time period of about 10 minutes to about 30 minutes, and in a second step at a temperature of about 400° C. to about 600° C. for a time period of about 10 minutes to about 30 minutes;

heating the coating applied to the superalloy gas turbine for densification and/or crystallization of the coating to thereby form the glass coating transformed to crystalline phase and/or a mixture of crystalline/amorphous phases, wherein heating is performed at a temperature of about 760° C. to about 850° C. for a time period of about 10 minutes to about 15 minutes in a vacuum, an inert atmosphere, and/or atmosphere having a different partial pressure of oxygen with respect to air, wherein the glass coating is in fully crystalline form and/or a mixture of crystalline and glass phases and has a coefficient of thermal expansion of from about 10 to about 18 µm/m-° C., wherein the glass coating reacts with molten salts of sodium, magnesium, vanadium, and/or sulfur dioxide gas to increase a melting point of the molten salts, thereby reducing deposition thereof on the gas turbine engine component.

12. The method of claim 11, wherein the one or more volatile organic compounds is selected from the group consisting of: alcohols, ketones, aldehydes.

13. The method of claim 11, wherein the one or more organic binders is selected from the group consisting of: acrylic polymers.

14. The method of claim 11, wherein forming the slurry or paste comprises adding the one or more surfactants and the one or more surfactants is selected from the group consisting of: medium-chain carboxylates of ammonium or sodium.

15. The method of claim 11, wherein forming the slurry or paste comprises adding the one or more surfactants.

16. The method of claim 11, wherein the glass coating reacts with the molten salts, thereby preventing deposition thereof on the gas turbine engine component.

* * * * *